United States Patent
Zhang et al.

(10) Patent No.: US 12,555,296 B2
(45) Date of Patent: Feb. 17, 2026

(54) ADAPTING SIMULATED CHARACTER INTERACTIONS TO DIFFERENT MORPHOLOGIES AND INTERACTION SCENARIOS

(71) Applicant: Roblox Corporation, San Mateo, CA (US)

(72) Inventors: Yunbo Zhang, Atlanta, GA (US); Victor B. Zordan, Riverside, CA (US); Mubbasir Turab Kapadia, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 101 days.

(21) Appl. No.: 18/656,299

(22) Filed: May 6, 2024

(65) Prior Publication Data
US 2025/0342637 A1    Nov. 6, 2025

(51) Int. Cl.
*G06T 13/40*        (2011.01)
(52) U.S. Cl.
CPC ................................... *G06T 13/40* (2013.01)
(58) Field of Classification Search
CPC . G06T 13/40; G06T 13/20; A63F 2300/6607; G06N 3/45; G06N 3/092
See application file for complete search history.

(56) References Cited

U.S. PATENT DOCUMENTS

2022/0051106 A1\* 2/2022 Luo ..................... G06N 3/0475

OTHER PUBLICATIONS

Mo, Clinton, Kun Hu, Shaohui Mei, Zebin Chen, and Zhiyong Wang. "Keyframe extraction from motion capture sequences with graph based deep reinforcement learning." In Proceedings of the 29th ACM International Conference on Multimedia, pp. 5194-5202. 2021. (Year: 2021).\*
"Bullet real-time physics simulation", Bullet RealTime Physics Simulation; https://pybullet.org/wordpress/, Mar. 21, 2022.
Bae, et al., "PMP: Learning to Physically Interact with Environments using Part-wise Motion Priors", arXiv preprint arXiv:2305.03249, 2023, 13 pages.

(Continued)

*Primary Examiner* — King Y Poon
*Assistant Examiner* — Vincent Peren
(74) *Attorney, Agent, or Firm* — IP Spring

(57) ABSTRACT

Some implementations relate to methods, systems, and computer-readable media for adapting simulated character interactions to different morphologies and interaction scenarios. The system accesses a graph representing a control policy for a simulated character's movements in a virtual environment. This graph undergoes encoding and processing through a graph neural network to generate latent embeddings for the graph. A fixed-length latent vector is determined from the latent embeddings. This vector is input to a feedforward neural network, generating control signals for the character's actions. Through a reinforcement learning loop, the character's motions are continuously refined by iteratively adjusting the graph based on evaluating the actions of the simulated character via a reward function, adapting the control policy to different character morphologies and/or interaction scenarios.

20 Claims, 6 Drawing Sheets

(56) References Cited

OTHER PUBLICATIONS

Bergamin, et al., "DReCon: data-driven responsive control of physics-based characters", ACM Transactions on Graphics (TOG) 38.6, 2019, 1-11.

Hassan, et al., "Synthesizing Physical Character-Scene Interactions", arXiv preprint arXiv:2302.00883, 2023, 9 pages.

Lee, et al., "QuestEnvSim: Environment-Aware Simulated Motion Tracking from Sparse Sensors", arXiv preprint arXiv:2306.05666, 2023, 9 pages.

Makoviychuk, et al., "Isaac gym: High performance gpu-based physics simulation for robot learning", arXiv preprint arXiv:2108.10470, 2021, 32 pages.

Peng, et al., "Amp: Adversarial motion priors for stylized physics-based character control", ACM Transactions on Graphics (ToG) 40.4, 2021, 1-20.

Peng, et al., "Deepmimic: Example-guided deep reinforcement learning of physics-based character skills", ACM Transactions on Graphics (TOG) 37.4, 2018, 1-14.

Winkler, et al., "QuestSim: Human motion tracking from sparse sensors with simulated avatars", SIGGRAPH Asia 2022 Conference Papers, 2022, 8 pages.

Won, et al., "A scalable approach to control diverse behaviors for physically simulated characters", ACM Transactions on Graphics (TOG) 39.4, 2020, 33-1.

Won, et al., "Control strategies for physically simulated characters performing two-player competitive sports", ACM Transactions on Graphics (TOG) 40.4, 2021, 1-11.

Won, et al., "Learning body shape variation in physics-based characters", ACM Transactions on Graphics (TOG) 38.6, 2019, 1-12.

Won, et al., "Physics-based character controllers using conditional vaes", ACM Transactions on Graphics (TOG) 41.4, 2022, 1-12.

Xu, et al., "Composite Motion Learning with Task Control", ACM Transactions on Graphics (TOG), 2023, 18 pages.

Zhang, et al., "Simulation and Retargeting of Complex Multi-Character Interactions", arXiv preprint arXiv:2305.20041, 2023, 11 pages.

Christ, et al., "Graph Neural Networks for Reinforcement Learning", Retrieved from Internet: https://ai.hdm-stuttgart.de/news/2021/selected-topics-3-graph-neural-networks-for-reinforcement-learning/, May 10, 2021, 47 pages.

EPO, Extended European Search Report for European Patent Application No. 25174196.3, Aug. 8, 2025, 9 pages.

Tessler, et al., "CALM: Conditional Adversarial Latent Models for Directable Virtual Characters", arvix.org, Cornell University Library, May 2, 2023, 15 pages.

\* cited by examiner

ADAPTING SIMULATED CHARACTER INTERACTIONS TO DIFFERENT MORPHOLOGIES AND INTERACTION SCENARIOS

TECHNICAL FIELD

Implementations relate generally to the field of character simulation in virtual environments. More specifically, implementations relate to methods and systems for accessing and processing motion control policies for adapting the movements and interactions of simulated characters to different morphologies and interaction scenarios.

BACKGROUND

Simulated environments and virtual character interactions are a significant source of attention for developers of video games and virtual experiences. An ongoing focus in this area is to enhance the realism and adaptability of character animations. Existing methodologies often rely on predefined motion capture data or handcrafted animations, limiting the versatility and adaptability of characters within virtual environments. These approaches face challenges in translating specific movements of a character to various different character morphologies and interaction scenarios.

The limitations of current systems become apparent in their struggle to generalize motion control policies across different character types and interactions. The lack of a robust framework to automatically adapt control policies for varying character morphologies and interaction contexts poses a significant hurdle. Existing approaches often necessitate manual adjustments and lack the ability to dynamically respond to changing virtual scenarios. Furthermore, these methodologies may struggle with achieving nuanced and contextually appropriate character interactions, particularly in complex virtual environments where characters must perform diverse actions.

Thus, there is a need in the field for methods and systems for facilitating character animations that can be seamlessly adapted to different character morphologies and respond dynamically to the intricacies of diverse virtual interactions. Addressing these challenges would improve the field of character simulation in virtual environments, and ensure a more immersive and flexible experience for users of such virtual environments.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations relate to adapting simulated character interactions to different morphologies and interaction scenarios. In some implementations, the system accesses a graph representing a control policy for a simulated character's movements in a virtual environment. This graph undergoes encoding and processing through a graph neural network to generate latent embeddings for the graph. A fixed-length latent vector is determined from the latent embeddings. This vector is sent as input into a feedforward neural network, generating control signals for the character's actions. Through a reinforcement learning loop, the character's motions are continuously refined by iteratively adjusting the graph based on evaluating the actions of the simulated character via a reward function, adapting the control policy to different character morphologies and/or interaction scenarios.

For example, in some implementations, a computer-implemented method includes accessing a graph representing a motion control policy for a simulated character in a virtual environment, the graph comprising a plurality of nodes, the nodes comprising features of a body of the simulated character and the virtual environment. The method includes encoding information for the graph, including one or more of: position, velocity, or orientation of each node, and the information includes relational information of node pairs connected by edges. The encoded information is processed through a graph neural network to generate one or more latent embeddings for the nodes of the graph. The method includes determining a fixed-length latent vector from the one or more latent embeddings, sending the fixed-length latent vector as input into a feedforward neural network to output control signals for the simulated character. The method includes applying the control signals to the body of the simulated character within the virtual environment to provide actions of the simulated character, and evaluating the actions of the simulated character via a reward function to assess motion quality of the actions and interaction quality of the actions. The method includes adapting the control policy through reinforcement learning by iteratively adjusting the graph based on the evaluating via the reward function, wherein the adaptation generalizes to one or both of: different character morphologies and different interactions within the virtual environment.

Various implementations and examples of the method are described. For example, in some implementations, determining the fixed-length latent vector includes discarding a portion of the one or more latent embeddings to remove information pertaining to a subset of the nodes. In some implementations, the graph neural network includes one or more graph attention network (GAT) layers. In some implementations, the feedforward neural network comprises a multi-layer perceptron (MLP) that includes a sequence of fully connected layers. In some implementations, the virtual environment comprises at least one additional character that the simulated character interacts with as part of the motion control policy. In some implementations, the nodes of the graph represent a plurality of internal points on the simulated character and a plurality of external points that are external to the simulated character. In some implementations, the edges of the graph represent the nearest neighbors of each node determined by a K-nearest neighbor (KNN) algorithm. In some implementations, the encoding further comprises computation of angular velocity for each node. In some implementations, the graph is updated dynamically based on interactions of the character within the simulated environment. In some implementations, the graph is updated dynamically based on a changing location of a target character or object within the simulated environment. In some implementations, discarding the portion of the latent embeddings includes selectively compressing information specific to one or more of the nodes in the graph.

In some implementations, a system comprising one or more processors coupled to a memory having stored thereon software instructions that, when executed by the one or more processors, cause the one or more processors to perform operations. The operations include accessing a graph representing a motion control policy for a simulated character in a virtual environment, the graph comprising a plurality of nodes, the nodes comprising features of a body of the simulated character and the virtual environment. The operations include encoding information for the graph comprising one or more of: position, velocity, or orientation of each node, the information including relational information of node pairs connected by edges, processing the encoded information through a graph neural network to generate one or more latent embeddings for the nodes of the graph. The operations include discarding a portion of the one or more latent embeddings to remove information pertaining to a subset of the nodes to obtain a fixed-length latent vector, and sending the fixed-length latent vector as input into a feedforward neural network to output control signals for the simulated character. The operations include applying the control signals to the body of the simulated character within the virtual environment to provide actions of the simulated character, and evaluating the actions of the simulated character via a reward function to assess motion quality of the actions and interaction quality of the actions. The operations include adapting the control policy through reinforcement learning by iteratively adjusting the graph based on the evaluating via the reward function, wherein the adaptation generalizes to one or both of: different character morphologies and different interactions within the virtual environment.

Various implementations and examples of the system are described. For example, in some implementations, the reward function comprises one or more of: joint angle matching, joint velocity matching, end-effector position matching, or root state matching. In some implementations, the reward function comprises a product of a joint-matching term and an interaction-matching term. In some implementations, the control signals determine one or both of: angles or torques for joints in the simulated character. In some implementations, the instructions further cause the system to perform an operation comprising random sampling to introduce additional nodes during the training phase. In some implementations, the graph neural network includes one or more graph attention network (GAT) layers, and the feedforward neural network comprises a multi-layer perceptron (MLP) that includes a sequence of fully connected layers. In some implementations, the operation of adapting the control policy comprises transfer learning for additional simulated characters, wherein the simulated characters perform tasks involving synchronized actions. In some implementations, the outputs of the feedforward neural network are utilized to generate a database of motion patterns for one or both of: a plurality of different character morphologies, and a plurality of different interaction scenarios.

In some implementations, a non-transitory computer readable medium with instructions stored thereon that, when executed by a processor, cause the processor to perform operations. The operations include accessing a graph representing a motion control policy for a simulated character in a virtual environment, the graph comprising a plurality of nodes, the nodes comprising features of a body of the simulated character and the virtual environment. The operations include encoding information for the graph comprising one or more of: position, velocity, or orientation of each node, the information including relational information of node pairs connected by edges. The operations include processing the encoded information through a graph neural network to generate one or more latent embeddings for the nodes of the graph, modifying a portion of the latent embeddings to obtain a fixed-length latent vector, and sending the fixed-length latent vector as input into a feedforward neural network to output control signals for the simulated character. The operations include applying the control signals to the body of the simulated character within the virtual environment to provide actions of the simulated character, evaluating the actions of the simulated character via a reward function to assess motion quality of the actions and interaction quality of the actions, and adapting the control policy through reinforcement learning by iteratively adjusting the graph based on the evaluating via the reward function, wherein the adaptation generalizes to one or both of: different character morphologies and different interactions within the virtual environment.

Some implementations may include a system that includes a processor and a memory coupled to the processor. The memory may have instructions stored thereon that, when executed by the processor, cause the processor to perform operations that include one or more of the features of the methods and/or a computer readable medium described above. Some implementations may include a computer-implemented method that includes one or more of the operations performed by a processor of a system and/or via a computer readable medium described above. Some implementations include a non-transitory computer-readable medium with instructions stored thereon that, when executed by a processor, cause the processor to perform operations that can be the same or similar to features of the methods and/or systems described above.

DETAILED DESCRIPTION

Figure 1:
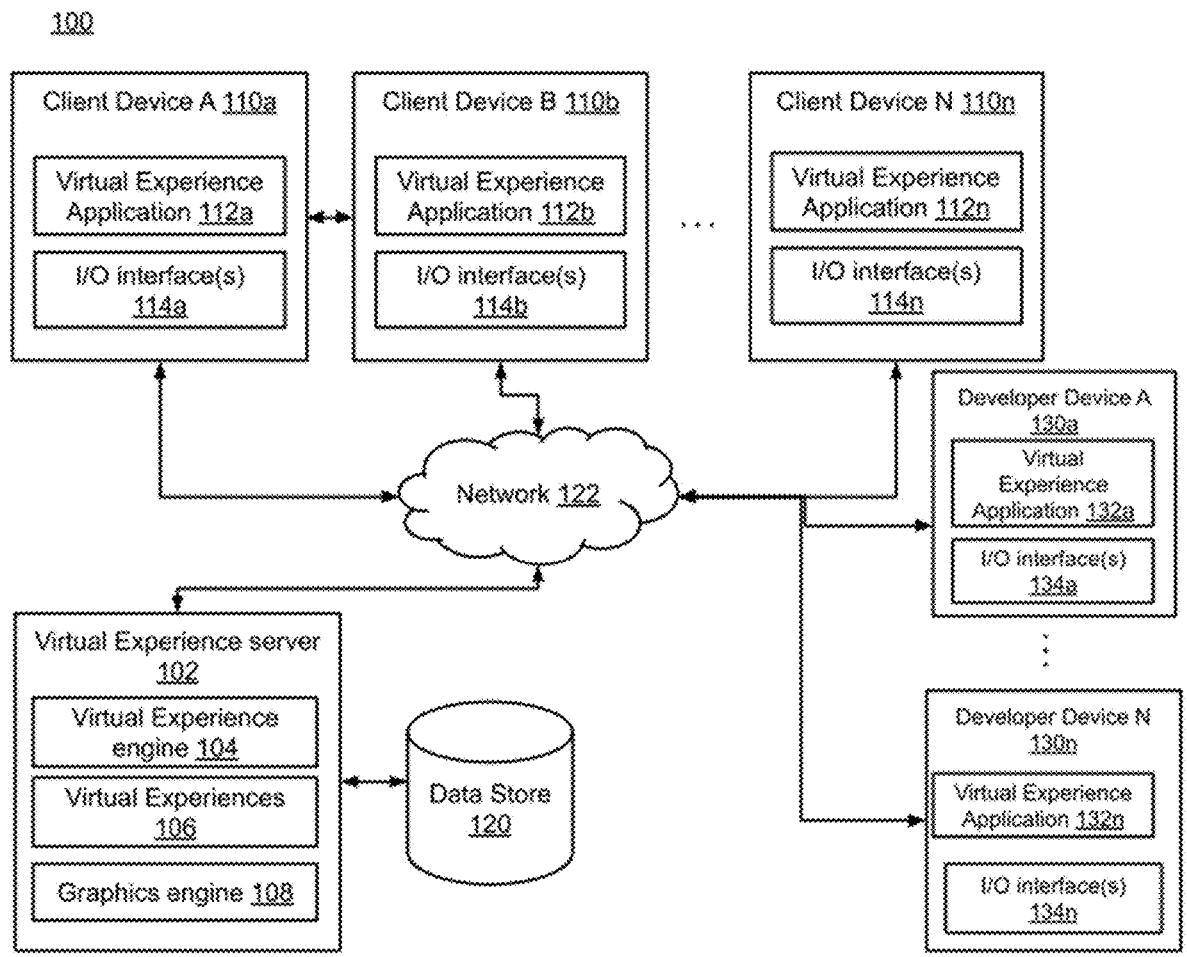
FIG. 1 is a diagram of an example system architecture for adapting simulated character interactions to different morphologies and interaction scenarios, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to adapting simulated character interactions to different morphologies and/or interaction scenarios. In some implementations, a general neural network pipeline is described that is capable of processing any spatial representation of a scene. The spatial information is processed by layers of a graph neural network (GNN) (e.g., a graph attention network) and is cast into a latent space. The latent embeddings can be modified to obtain a latent vector; for example, a certain amount of redundant information in the latent space can be discarded, resulting in a fixed-sized latent variable that may capture the nature of the desired motion. The fixed-sized latent variable can be processed through a feedforward neural network (e.g., an MLP network). This network architecture allows a single generalized policy to be learned by a neural network, which can be applied for a wide variation of character shapes and morphologies, and/or can be used to represent different physical interaction scenarios between a character and the surrounding environment in a virtual environment.

In some examples, a multi-agent reinforcement learning process is provided, in which control policies are trained to produce control signals for simulated characters. At each control step, the policy can receive input of an observation describing the state of the simulated character as well as reference future poses. The policy outputs a joint angle to be used to compute torques for each joint of the character. A reward function is used to measure both the motion quality as well as the interaction quality of the character.

In one or more implementations, described techniques enable a single policy to be able to control a character to interact with its surroundings given a various number of spatial locations the character can attend to. In some implementations, the character and local environment state can be represented using a graph structure where the graph nodes are placed on the character's body parts and also on other objects of the environment that surrounds the character (e.g., other characters or other objects). In some implementations, the edges of the graph are constructed by computing the K-nearest neighbor of a number of neighbors for each node and connecting the neighboring nodes.

In one or more implementations, the interaction graph can be considered an observation, which can include, e.g., position, velocity, orientation, and angular velocity of all graph nodes as well as the differences of the information in node pairs of all edges. A number of nodes and edges outside the controlled character are not fixed and are variable. In some implementations, a GNN-based neural network architecture is used that can directly process the graph structure and handle a variable number of external nodes (external to the character) by keeping a fixed-length latent specification after encoding and processing the graph. The latent variable is fed into a series of fully connected layers to output an action.

In some implementations, described techniques can train a policy for a single character, e.g., where such a policy does not depend on a particular number of environmental objects interacting with the character. The single-character policy can be used to train a generalized policy for various different interactions of the character with other object(s) and/or to provide different character morphologies. For example, during the training of the single character, multiple nodes surrounding different body parts of the character can be randomly sampled in addition to the existing nodes. The interaction graph reward and the motion imitation reward are then optimized so that the single-character policy is capable of attending to different morphologies and/or region interactions. The pre-trained model can then be used as a base policy for further multi-character interaction training.

In some implementations, to preserve both the motion quality and the interaction quality, the reward function can be a product of two parts: joint-matching terms and an interaction-matching term. The joint-matching reward term measures the joint angles, joint velocities, end-effector positions, and root state matching between simulated and reference character. The interaction-matching term measures edge differences in the graph, where edges are connecting graph nodes that are outside of the character.

Advantages can include providing a reinforcement learning formulation that allows training control policies to be aware of varying external environment states around characters or other objects, which are able to control the characters to perform various levels of realistic physical motions and interactions. The training control policies can be generalized to accommodate different environments and/or different character morphologies. Described features can facilitate the implementation of a general simulation and training pipeline for physically simulated character control, e.g., where users can set up and run training jobs for general simulated motion imitation controllers with minor input such as changes to parameters. Described techniques can provide realistic physical simulation and interaction to various different types of characters in a virtual experience, thereby improving an immersive experience for users.

Described features provide several technical advantages over previous techniques for providing control policies for characters in virtual environments. For example, described features provide technical advantages that enable reduction of use of computational resources (e.g., computer memory, processor use and time, networking traffic bandwidth, display processing and memory usage, etc.) in various described implementations. For example, previous control policies were fixed to particular environments and did not generalize to an unseen environment, due to the lack of perception to the surrounding environment of the controlled character; thus, different control policies were specifically trained and used for different environments. By contrast, the described control policies can adapt to a variable number of nodes (e.g., external nodes) and/or a reduced number of nodes (e.g., after discarding nodes) and thus can be used as a generalized control policies. This allows a single control policy to be trained and used in a variety of environments with a varying number of objects, thus saving computational resources that would otherwise be used in training and storing multiple control policies.

Another example technical advantage is that described features allow for a virtual environment with digital characters, e.g., avatars, to use control policies for animating the avatars in such a way that the control policies can generalize to any kind of character and any kind of interaction, i.e., any interaction with any elements, objects, or characters in the scene. For example, this includes generalizing a control policy to characters with any skeletal morphology or representation, or any character a user of a virtual environment may be able to create. For example, this includes generalizing a control policy to interaction with any aspect of geometry within a virtual environment, not just avatars or objects. This allows a single control policy to be trained and used for a variety of characters, thus saving computational resources that would otherwise be used in training and storing multiple control policies for multiple types of characters.

FIG. 1 is a diagram of an example system architecture that can be used to adapt simulated character interactions to different morphologies and interaction scenarios, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual gaming server. For example, the gaming server may provide single-player or multiplayer games to a community of users that may access a "system" herein that includes online gaming server 102, data store 120, and client device 110 and/or may interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110a to client device 110b) participating in the virtual experience 106. The client devices 110 may use the experience instructions and render the virtual experience for presentation on the displays of client devices 110.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110b to client device 110n), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, which are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

Figure 2:
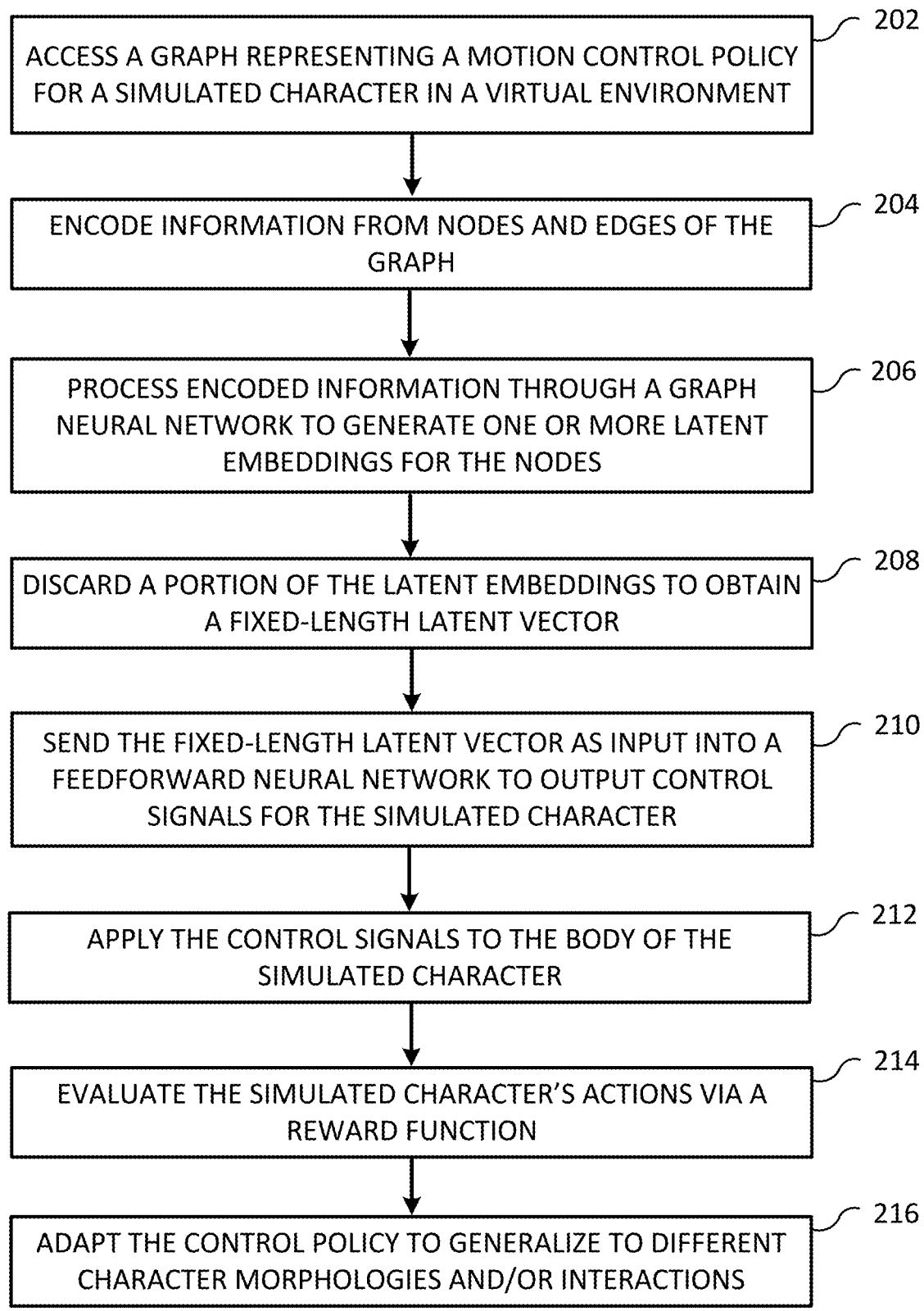
FIG. 2 is a flow diagram illustrating a method of adapting simulated character interactions to different morphologies and interaction scenarios, in accordance with some implementations.

FIG. 2 illustrates a method of adapting simulated character interactions to different morphologies and interaction scenarios. In various embodiments, the blocks shown in FIG. 2 and described below may be performed by any of the elements illustrated in FIG. 1.

At block 202, the system accesses a graph representing a motion control policy for a simulated character in a virtual environment (e.g., a simulated environment, virtual space, etc.). In some implementations, this graph can be considered a base control policy. In some implementations, the graph is a spatial graph, and the graph includes multiple nodes, each node corresponding to a component of the simulated character's anatomy or to an element within the character's environment. In some implementations, links can be made between particular nodes to indicate anatomical components of the simulated character, such as body parts (e.g., limbs or portions thereof, such as upper arm, lower arm, upper leg, etc.). In some implementations, the nodes contain data related to the character or environment, such as, for example, the position, velocity, and orientation of the respective character component or environmental element.

A character has a particular morphology, and different characters may have different morphologies. A morphology may be characterized by a skeleton of nodes or links. In some examples, characters that have similar body parts, but different limb lengths, may have different morphologies. In further examples, characters that have different numbers of arms, heads, or other body parts have different morphologies.

Edges within the graph define the relationships between the nodes. For example, edges can indicate connectivity between particular nodes. The relationships can be indicative of the articulation between anatomical components, such as, e.g., limb joints and limbs, or of interactive elements between the character and environmental objects. The edges enable the identification and differentiation of interactions within the virtual environment. For example, graph edges can connect two adjacent joints, such as in a representation of a particular limb of a character. Graph edges can also connect any two nodes in the graph which may not be adjacent. A node in a graph may also be "external" to a character, in which case it does not represent a joint on the character's body. Graph edges can thus be used to represent any type of connection between nodes in the graph.

An "interaction" as used herein refers to the dynamic engagement between a simulated character and elements (e.g., other characters or objects external to the simulated character) within a virtual environment. This encompasses a spectrum of activities, such as the character's movements in relation to their own body parts or external characters or objects. For instance, the movement of an avatar's hand concerning its shoulder or the manipulation of an object in the virtual space can be considered distinct interactions.

The graph structure representing a control policy serves as a comprehensive framework to encapsulate these interactions. Each node in the graph corresponds to key features of the simulated character's body and the virtual environment, forming a representation that mirrors the character's morphology and any external objects the character interacts with. Edges in the graph signify the connections between these nodes, encapsulating the relational information and spatial dependencies.

An "interaction scenario" as used herein refers to control policy information on the differing contexts and elements that influence how a simulated character performs any given interaction. This can include, for example, the specific conditions, objects, or entities involved in an interaction. For example, the interaction scenario of a character lifting a cup from a table can evolve when the character encounters different objects such as a ball, trophy, pen, or phone. In another example, the same character may pick up the same ball in a different way if they are picking up the ball in a windstorm, or if there are various other external objects in the path that the character must navigate around. In this way, interaction scenarios represent tailored instances of engagement, reflecting the adaptability and flexibility of the control policy to navigate differing virtual environments and scenarios and respond appropriately to a multitude of situational nuances.

In some implementations, the system generates a graph data structure (or other representation) representing the graph by training a neural network on different examples of motions of simulated characters. Each of such motions of these characters can be represented, for example, as a different interaction graph. The system then generates a graph that represents the neural network that was trained for a specific motion interaction. This graph is a motion control policy that, when executed on a character, functions to reproduce that motion interaction. The system then accesses this graph representing the motion control policy.

In some implementations, the system accesses the graph by retrieving the graph data structure from a storage medium. In some implementations, this graph data structure models the state of both the character and relevant environmental entities through a network of nodes and edges. Nodes are assigned to specific points indicative of the character's body and environment, while edges represent the connections that define their relationships.

In some implementations, the nodes can embody positional data and potentially other kinematic data pertaining to parts of the character's body, such as, for example, joints and/or limbs of a character, as well as environmental objects that can interact with the character. In some examples, a respective node can represent a head, a neck, each hand, each wrist, each forearm, each upper arm, each upper leg, each lower leg, each angle, each foot, etc. (see FIGS. 4A and 4B for some examples). Edges connect these nodes to map out the possible interactions within the graph framework. The graph serves as input for a motion control policy capable of rendering the character's interaction with their surroundings. In some implementations, the system retrieves the graph through a computational method such as, for example, a query or read operation that extracts the graph from its storage location and places it into working memory for processing.

In some implementations, the simulated character represents a humanoid avatar with a skeletal structure. In some implementations, the skeletal structure within such an avatar can be configurable in number and arrangement of bones. This configuration allows the system to adapt to varied morphologies of humanoid avatars across different implementations. Other forms of avatars can also be used, e.g., avatars that represent animals or objects.

In some implementations, avatars are operative within a virtual environment where the avatars may interact with other entities (e.g., other avatars, virtual objects, etc.). In some implementations, the motion control policy generates signals that direct movements of an avatar's joints and limbs. These signals are based on the avatar's skeletal structure and affect the avatar's positioning, rotation, and articulation within the virtual environment.

In some implementations, the motion control policy is designed for generality across different avatars. The motion control policy is developed through training on a variety of skeletal structures, which equips the policy to manage the animation of a range of humanoid avatars. This generalization allows the use of a single policy to animate different humanoid avatar forms in the virtual environment.

In some implementations, the virtual environment contains at least one additional character that the simulated character interacts with as part of the motion control policy. In some implementations, defined algorithms govern the interactions between the simulated character and the additional characters, where the simulated character's policy adapts according to the prescribed dynamics of the environment and the actions of other characters. In some implementations, the system can utilize the motion control policy to detect and respond to the presence and activities of other characters. The policy operates to manage the simulated character's navigational functions and manipulation of objects, as well as interactions with other characters. In some embodiments, the simulated character is programmed to modify its responses in accordance with predefined interaction protocols which may include a range of cooperative and independent activities. For example, one predefined interaction protocol may relate to a self-interaction, where the simulated character is programmed to interact with itself such as by, e.g., moving its hand to scratch its nose or slap its body. Another example of an interaction protocol may be an interaction with an object, such as, e.g., catching a ball. Yet another example of an interaction protocol may be an interaction with another avatar, e.g., the simulated character dancing with another simulated character.

In some implementations, the motion control policy includes spatial and temporal information relating to character positions and movements within the environment. The algorithms calculate positional data and predict potential interactions. In some implementations, this allows the simulated character to adjust its behavior in real-time.

In some implementations, the nodes of the graph represent a number of internal points on the simulated character and a number of external points that are external to the simulated character. In some implementations, internal nodes may represent specific points on a simulated character, such as, for example, joints and/or centers of mass.

In some implementations, the graph integrates external nodes representing specific points in the surrounding virtual environment external to the character nodes and/or edges. In some implementations, at least a subset of the external nodes are related to locations where interactions between the simulated character and other characters or objects are anticipated. For example, one such location may be a space in the virtual environment near a character's head that a ball is moving toward, or a space (e.g., near the hands of two characters) where the two characters are both trying to grab a single object within the virtual environment. In some implementations, the external nodes can be randomly sampled, e.g., nodes surrounding different body components of the character. In some implementations, the used of external nodes causes the control policy to attend certain locations of the joints to the external nodes, thus causing the control policy to attend to different interactions.

In some implementations, nodes are selected and represented within the graph based on their location on the simulated character or within the virtual environment. The graph is structured to include both character nodes and environment-related external nodes.

In some implementations, the edges of the graph represent the nearest neighbors of each node, which can be determined according to a K-nearest neighbor (hereinafter "KNN") algorithm or similar algorithm. This algorithm determines the edges by identifying a predefined number of nearest nodes for each node based on spatial proximity metrics. For example, in some implementations, four nearest nodes can be used, or other number in various other implementations. In some implementations, the KNN algorithm processes multidimensional data by considering the positions and orientations of the nodes. It can compute proximity using predetermined distance metrics, which may include standard measures like Euclidean distance or application-specific measures. These metrics guide the KNN algorithm in forming a graph that reflects the spatial organization and relationships relevant to the simulation tasks.

In some implementations, the graph structure is dynamically updated by the KNN algorithm, which recalculates node connections in response to movement and interaction of the character within the virtual environment. This results in a graph that is consistently reflective of the current state of the character with respect to the virtual environment, including the character's position and interaction status.

In some implementations, the graph is updated dynamically based on the character's interactions within the virtual environment. For example, the graph may be updated in response to interactions occurring within the virtual environment. These updates adjust the attributes and relationships of nodes within the graph, which correspond to the character's body parts and elements in the surrounding environment.

In some implementations, an update mechanism alters the graph by adding, removing, or modifying nodes and edges. Node attributes such as, e.g., position, velocity, or orientation are changed when required by a character's actions or interactions with objects and other characters. In some implementations, the system makes use of one or more algorithms to update the graph by detecting changes in the simulated environment. These algorithms track relevant data points such as, e.g., position shifts or velocity changes to maintain an up-to-date representation of the interactions within the graph structure.

In some implementations, the graph is updated dynamically based on a changing location of a target character or object within the virtual environment. For example, the system may utilize a graph updating mechanism to track and reflect changes in positions and movements of characters or objects within the virtual environment. The system adjusts the graph elements, which include nodes and edges, in accordance with the movements to ensure the graph remains current with respect to the state(s) of the virtual environment. In some implementations, the dynamic updating of the graph is determined in part by the changing location of the target character or object within the simulated environment. As the graph is updated, the motion control policy remains responsive to the spatial context and positional changes of the target character or object. In some implementations, the system takes into account the real-time movements and positions of the target character or object, triggering adjustments in the graph structure to accommodate the changing interaction dynamics. In one example, if the simulated character is attempting to grasp a ball object (i.e., target object) that is moving in mid-air within the environment according to simulated physics properties of a ball in flight, the graph can be dynamically adjusted in real time as the ball's position or trajectory changes to reflect this evolving spatial relationship.

In some implementations, the system allows for simulated characters to modify their behaviors in response to changes in the virtual environment. The dynamic updating of the graph may underpin these modifications, enabling characters to adjust their movement strategies and align their actions with the updated environmental conditions. In some implementations, the system dynamically updates the graph by triggering updates based on specific events. In one example, an avatar within a game environment may have new motion control abilities enabled depending on whether zero gravity conditions are enabled for a particular virtual room. In another example, an avatar may be subject to new motion control policies based on different simulated environmental conditions, such as rain, wind, or ice. The system may operate periodically or continuously to assess and implement changes within the virtual environment and/or for the character. In some implementations, the system effectuates updates by recalibrating nodes and edges of the graph as required by the virtual environment motions and interactions.

At block 204, the system encodes information from nodes and edges of the graph. Encoding information for the graph involves collecting and representing specific data attributes for each node. The nodes correspond to features of the simulated character and environmental elements. In some implementations, the system captures position data of each node within the graph to define where elements are spatially located in the simulation space. In some implementations, the system encodes velocity data for each node, which captures movement over time for all elements in the simulation.

In some implementations, orientation details, which include the directional facing of each node, are encoded to define how elements are oriented in the simulated environment. Angular velocity is encoded for each node, specifying the rate of change in orientation, which is relevant for actions that involve rotation.

In some implementations, the system encodes relational data for connected node pairs within the graph. This includes information about how nodes interact with one another based on their connections, which is delineated by edges. These edges provide the structure of the simulated character's body and define relationships with environmental elements.

In some implementations, the encoding includes computation of angular velocity for each node. In some implementations, the system encodes angular velocity for each node in order to quantify the rotational dynamics of the simulated character's movements and interactions with objects and other characters in the virtual environment.

At block 206, the system processes the encoded graph information via a neural network that is based on a graph neural network (hereinafter "GNN") architecture. In some implementations, the neural network can be a graph attention network (hereinafter "GAT") and/or include GAT layers in order to generate latent embeddings for the graph nodes. In some implementations, the operation involves attention mechanisms which are applied to the node features, including, for example, position, velocity, orientation, and relational information from node pairs connected by edges. An attention mechanism in this context refers to a computational technique that selectively focuses on specific aspects of the node features, enabling the neural network to assign varying degrees of importance to different elements within the graph representation.

"Relational information" refers to the details concerning the connections or relationships between pairs of nodes in the graph. In some implementations, the system captures not only the intrinsic characteristics of each individual node, such as its position, velocity, or orientation, but also the inter-node relationships defined by the edges connecting them. These relationships can encompass a variety of spatial and contextual aspects that may be used to provide information to elements of the system about how different parts of the simulated character's body or the virtual environment interact. For example, in the case of a humanoid avatar represented by the graph, relational information could include, e.g., the spatial proximity of one joint to another, the relative orientation between body parts, or the dynamic interactions between nodes representing different elements of the character's anatomy.

In some implementations, the neural network's attention mechanism is calibrated to assign weights to the node features during processing, resulting in an allocated significance to each feature based on the graph structure. These weights are dynamically determined based on the graph structure, allowing the neural network to assign varying degrees of importance to each feature. Different weights allow the neural network to handle input features selectively during the creation of latent embeddings. For example, in some implementations, the weights of the neural network are learned automatically using well established machine learning optimization algorithms such as, e.g., gradient descent. For reinforcement learning tasks, algorithms such as proximal policy optimization ("PPO") may be utilized.

After processing the encoded graph information via the GNN, a reduced dimensionality representation of the input data is obtained in the form of a latent embedding. For example, the graph that may be represented as an N-dimensional vector can be processed by the GNN into an M-dimensional vector that is the latent embedding, where M is smaller than N. In some implementations, the structure of this embedding is compatible with the subsequent operations of the policy network, allowing for further processing to output control signals for simulated character movement.

In some implementations, the system uses one or more other types of graph neural network ("GNN") instead of or in addition to a GAT to encode a graph structure. The graph structure corresponds to a simulated character's motion policy within a virtual environment. The GNN utilizes node connectivity, which correlates to elements of the character's body and environmental objects. This connectivity enables the processing of spatial features such as, e.g., position, orientation, and velocity through the network.

In some implementations, the GNN can be used with respect to various graph structures, which differ in size and complexity. This configuration allows for the representation of characters with different morphologies and the simulation of various different interaction scenarios. The system utilizes the GNN to process and encode relational data reflecting dynamic interactions between the character and elements within the environment. In some implementations, the GNN's design is structured to support generalization across various interaction scenarios. GNN layers manage the requisite computational load associated with character-environment interactions. In some implementations, this includes the execution of more complex learning tasks required by higher-dimensional policy training operations.

At block 208, the system determines a fixed-length latent vector that represents a modified structure compared to the structure of the one or more latent embeddings. For example, the system can modify the latent embeddings to obtain the fixed-length latent vector. For example, in the example of FIG. 2, the system discards a portion of the latent embeddings to obtain a fixed-length latent vector. The discarding can involve the elimination of data corresponding to certain nodes within the graph representation.

In some implementations, during the discarding operation, a pre-determined algorithm or set of rules identifies and removes embeddings of nodes deemed non-essential for maintaining the functionality of the motion control policy. The criteria for discarding nodes' embeddings can be pre-defined and may be based on various characteristics, such as, for example, the nodes' relative influence or spatial relationships within the graph structure. "Relative influence" here refers to the significance or impact of a node within the overall graph, with nodes demonstrating greater influence being more likely to be retained. "Spatial relationships" here refers to the positions and connections between nodes, where the discarding algorithm may prioritize nodes contributing important information based on their spatial proximity or specific relationships within the graph.

The output of this block is a latent vector with a fixed dimensionality that contains condensed information from the original graph. This vector is formed by retaining only the embeddings that are necessary for generating the core motion control signals while eliminating excess data that is not necessary for the core motion control functions. By discarding a certain amount of unnecessary or redundant information in the latent space, the result may be a fixed-sized latent vector that may capture the nature of desired motion. This discarding can allow decoupling of the learning of the neural network from the structure of the graph, allowing the policy to generalize to different character morphologies as well as different interactions with the character's own nodes and/or with nodes of other objects in the virtual environment.

In some implementations, discarding a portion of the latent embeddings involves selectively compressing information specific to one or more of the nodes of the graph. This can include identifying and removing nodes that represent redundant or non-essential information for the graph-based representation of the control policy. In some implementations, the system utilizes selective compression to reduce the dimensionality of the interaction graph by eliminating certain nodes and their associated attributes, which can include, for example, position, orientation, or velocity data.

In some implementations, data in the embedded space that represents the external nodes (e.g., outside the character) is discarded and the internal, character node data is retained in the latent embeddings. This allows the internal nodes of the character to include information based on the (former) presence of the external nodes. Thus, the graph attention layers can "squeeze" extra information related to the external nodes to its neighboring internal nodes so that the policy knows which nodes it should be attending to and that an interaction is likely to occur at those nodes.

In some implementations, the system utilizes heuristics to determine which nodes to discard during the selective compression process. These heuristics are applied to evaluate the relevance of each node to the desired outcome of an interaction, with nodes having minimal influence on the outcome identified as candidates for removal. In some examples, nodes that are the furthest distance, or are more than a particular distance, from an interaction can be considered less relevant and can be discarded. In some implementations, random nodes of the graph can be discarded, allowing the neural network to learn and adapt based on these random discardings and new graph structure as described below. In some implementations, the system discards nodes randomly, so that the neural network is trained on a large diversity of graph structures. This random discarding of nodes in the graph may be performed in order to make the learned policy robust to different graph structures.

At block 210, the system sends the fixed-length latent vector as input into a feedforward neural network (hereinafter "FNN") to generate control signals for the simulated character. The FNN structure includes input, hidden, and output layers composed of nodes. Each node is associated with a set of weights and biases, applied to the input data as part of the transformation process. One example of a FNN which may be used is a multi-layer perceptron ("MLP"). In various implementations, other neural network architectures, such as convolutional neural networks which are applied to graphs (i.e., graph convolutional networks) may be utilized.

In some implementations, during operation, the latent vector is processed sequentially through the hidden layers. In each layer, the vector undergoes a weighted summation followed by an activation function, which introduces non-linearity. Typical activation functions used include sigmoid, hyperbolic tangent, or rectified linear unit (ReLU). The output of the hidden layers is fed forward to the output layer, which produces the control signals. These control signals correspond to specific actions or movements required by the simulated character's joints or actuators within the virtual environment.

The design of the FNN, in terms of the number and configuration of layers and nodes, the selection of activation functions, and the learning rate, enables mapping of the higher dimensional data represented by the latent vector into actionable control signals suitable for various simulated character morphologies and interaction scenarios. In some implementations, the network's parameters are determined during the training phase and fixed prior to this operation. The output of this block comprises the joint angles or torques necessary to direct the character's motion according to the intended interaction objectives.

In some implementations, the FNN includes a sequence of fully connected layers. These layers are used to map latent embeddings to control signals for a simulated character in a virtual environment. Each layer in the FNN transforms input features in a hierarchical manner to produce an output vector representing the control signals.

In some implementations, the FNN receives encoded information in the form of fixed-length latent vectors from a preceding layer, potentially a graph-based processing layer such as, for example, GAT layers. The fully connected layers of the FNN process these latent vectors and adjust the network's weights and biases to generate output.

In some implementations, the adaptability of the FNN is provided by the capacity to modify the number and density of neurons within the fully connected layers. This adjustability caters to varying complexities in interaction scenarios and differences in character morphologies. In some implementations, the control signals output by the FNN are applied to the simulated character to enable movement and interaction within the virtual environment. These signals typically correspond to the specification of, e.g., joint angles, velocities, and torques necessary for animation of the character.

In some implementations, the control signals determine one or both of: angles of joints, and torques of joints in the simulated character. These information may be used for manipulating joint movements of a simulated character. Specifically, in some implementations, joint angles and torques are required for articulating each joint. In some implementations, this enables movements within the virtual environment that comply with specified motion parameters. These signals direct the character's physical actions, including object manipulation and character-character interaction, as determined by the input from the virtual environment and the objectives encoded in the control policy. In some implementations, the FNN architecture outputs a vector of control signals for each joint in the simulated character's body. This architecture enables the production of specific articulation commands that are processed and applied to the character model.

At block 212, the system applies the control signals to the body of the simulated character. The application of control signals to the simulated character's body within the virtual environment consists of converting the output from the FNN into physical commands that control the character's movements. These control signals dictate joint angles and positions, corresponding to body segment movements, within the constraints of the character's physical simulation model.

In some implementations, each control signal corresponds to a movement parameter such as, for example, joint torque or position setpoint. The virtual environment processes these parameters and applies them to the character model, which may consist of a varying number of articulated segments or joints. As the simulation advances, these movements are executed according to the physical laws programmed into the simulation, including collision detection and response.

In some implementations, the virtual environment collects data on the execution of these control signals, including spatial and temporal accuracy relative to desired outcomes. In some implementations, the virtual environment provides real-time feedback based on the dynamics of the character's movements and interactions with other entities and objects in the simulation space.

At block 214, the system evaluates the simulated character's actions via a reward function. The reward function quantitatively evaluates the motion quality and interaction quality of actions performed by the simulated character. The reward function operates by comparing the simulated actions to one or more reference models. A reference model, in this context, serves as a benchmark or standard against which the simulated character's actions are assessed for motion and interaction quality. It is determined based on predefined criteria or models that encapsulate desirable characteristics or behaviors. During the evaluation process, the reward function systematically compares the executed actions of the simulated character to the attributes specified by the reference model. This comparative analysis forms the basis for quantifying the quality of the simulated character's motions and interactions, providing a measurable metric for reinforcement learning adaptation. For example, motion quality can be assessed by examining imitation of motion of the simulated character to a reference motion, e.g., by examining specific metrics such as, for example, the accuracy of joint angles, joint velocities, positioning of end-effectors, and the state of the character's root (e.g., a base point of reference in the simulated character's skeletal structure, such as the pelvis or the base of the spine). Comparison to these metrics allow the character's movements to be made consistent with target reference motion specified in the reference model.

In some implementations, interaction quality is measured by examining the simulated interactions of the character with one or more objects against reference interactions between objects specified in the reference model. This aspect of the reward function looks at the differences between edges in the character's interaction graph that connect the character's nodes to one or more nodes of other objects such as nodes belonging to entities in the environment or one or more nodes belonging to other characters.

In some implementations, the reward function includes one or more of: joint angle matching, joint velocity matching, end-effector position matching, and root state matching. A joint angle matching term may be used to measure the simulated character's joint angles relative to a reference model. A joint velocity matching term may be used to measure the velocity of the simulated character's joints against predetermined velocity profiles. An end-effector position matching term may be used to assess the accuracy of the end-effectors' positions, which are points on the character meant to interact with the environment. A root state matching term may be used to evaluate the position and orientation of a core part of the simulated character's body, which in some character morphologies may be, for example, the pelvis or torso.

In some implementations, the reward function is a product of two terms: a joint-matching term and an interaction-matching term. In some implementations, the joint-matching term can be a different type of matching term. In some implementations, the joint-matching term may function as a "motion-matching term" or imitation reward, meaning that it penalizes deviations from the reference motion. In some implementations, the reward terms can be defined explicitly and learned implicitly, for example, by training a motion discriminator.

In some implementations, the joint-matching term quantifies the alignment of the simulated character's joints with a reference motion, which may include, e.g., joint angles and velocities, positions of end-effectors, and the root state of the character. In some implementations, the interaction-matching term in the reward function evaluates the character's interaction within the virtual environment. This term calculates the differences between node pair information along the edges of the interaction graph, where these edges connect nodes outside of the character to other elements in the environment. In some implementations, the interaction matching term rewards minimizing the distance between a character internal node and an environmental external node, e.g., rewards movement of internal nodes toward external nodes. In some implementations, the reward function makes use of both the joint-matching and interaction-matching terms to assess motion imitation and environmental interaction. The control policy, driven by this combined reward function, adapts to produce outputs that account for both accurate motion replication and interaction dynamics.

An example of an overall reward function according to one or more implementations follows. For internal motion quality, the following reward function equations relate to, respectively: joint state matching ($r_{joint}$), end-effector position matching ($r_{ee}$), and root joint state matching ($r_{root}$):

$$r_{joint} = \exp(k_1 \sum \|q_{sim} - q_{ref}\|) \cdot \exp(k_2 \sum \|\dot{q}_{sim} - \dot{q}_{ref}\|)$$

$$r_{ee} = \exp(k_3 \sum \|x_{sim} - x_{ref}\|)$$

$$r_{root} = \exp(k_4 [\|p_{sim} - p_{ref}\| + \|q_{sim} - q_{ref}\|])$$

For external interaction quality, the following reward function equation relates to external edge similarity between simulation and reference:

$$r_{edge} = \exp(k_5 [\sum w \|\epsilon_{sim} - \epsilon_{ref}\|])$$

In these equations, q is a joint orientation, q̇ is an angular velocity, x is a center of mass position, p is a position, ε is a position attribute of an edge (e.g., based on a position difference between connecting nodes), w is the weight of the term, $k_1$ to $k_5$ are sensitivities of the terms, and "sim" refers to the simulation graph while "ref" refers to the reference graph. In some implementations, an interaction reward function can be determined by measuring distances between positions and velocities of the reference graph and the simulated graph using weighted edges, and determining the interaction reward function based on the measured distances, e.g., to reward minimization of distance between internal nodes and external nodes, and/or reward movement of the internal nodes toward the external nodes.

At block 216, the system adapts the control policy through reinforcement learning by iteratively adjusting the graph based on the evaluation process via the reward function. The adaptation generalizes to one or both of: different character morphologies and different interaction scenarios within the virtual environment. The adaptation phase involves refining the control policy through reinforcement learning, which provides adaptability and generalization of the motion control system. Through a learning process via the reward function, the control policy iteratively undergoes adjustments, refinements, and/or optimizations based on the evaluation of simulated character actions.

To adapt the control policy, the system employs reinforcement learning, a paradigm where the system learns through trial and error, continually adjusting its behavior to maximize the defined rewards. This iterative optimization aims to factor in different character morphologies and diverse interaction scenarios within the virtual environment. The system actively learns from the simulated character's interactions and refines the control signals based on the specified reward function, ensuring that the adapted control policy is not confined to specific character types or interactions, but instead extends its applicability to a broader spectrum.

In some implementations, the process of adapting a control policy to different interaction scenarios involves leveraging reinforcement learning to adapt the control policy across a spectrum of contextual variations within a broader interaction category. For example, a simulated character may be tasked with the interaction scenario of lifting an object from a surface. This generic interaction type can manifest in diverse ways depending on the specific object involved. The control policy, driven by reinforcement learning, undergoes adaptation to account for situational nuances associated with different objects. In this way, the control policy is trained to dynamically adjust the same lifting motion of a character to accommodate scenarios featuring distinct objects such as a cup, a ball, a trophy, a pen, or a phone. Each object may introduce unique spatial considerations and characteristics that influence the execution of the interaction. Through the reinforcement learning-driven adaptation process, the control policy gains the ability to generalize its approach across a myriad of interaction scenarios within a specified interaction type.

In some implementations, the system utilizes reinforcement learning to adapt a control policy to various differing character morphologies, allowing the control policy to be generalized across different anatomical structures of characters. For instance, consider a control policy designed for a humanoid avatar with a specific skeletal structure. Through reinforcement learning, this policy can adapt to accommodate diverse character morphologies by learning representations of motion that apply broadly beyond specific skeletal configurations. The reinforcement learning mechanism enables the control policy to discern motion patterns, features, and characteristics that are applicable across a range of morphological variations, and then apply them to specific different morphologies. For example, the control policy can be trained to adapt its motion representations to different humanoid avatars with varying limb lengths, joint placements, or body proportions. The adaptation process ensures that a single control policy can be adapted across different avatars with distinct morphologies while taking into account and applying the information from the control policy pertaining to the broader interaction to be achieved.

In some implementations, the system utilizes random sampling techniques to insert additional nodes during the training phase. In some implementations, the training phase utilizes variable node placement, which relates to different regions of the character, to develop a generalizable control policy across a range of virtual environment interactions and character morphologies. In some implementations, additional nodes are placed on the character and/or within the virtual environment randomly during training. This random placement alters the character-environment spatial relationship in the graph representation. Adding such nodes allows the control policy to dynamically accommodate changes in the graph structure.

In some implementations, the introduction of randomly sampled nodes diversifies the set of data available for reinforcement learning. This randomization affects the graph representation at each iteration of the training. It influences the neural network to process the graph structure, focusing on the significant parts for the motion control policy. The system can develop a control policy applicable to different graph arrangements not limited to specific training configurations.

In some implementations, the system adapts the control policy by utilizing transfer learning for additional simulated characters. The transfer learning approach enables the system to utilize the initial model, trained on a specific character or task, as a starting point for training other characters. In some implementations, the system preserves certain network layers and parameters from the original model, while other parameters are adjusted to reflect the structural and interactive attributes of new characters. As such, the policy can then be specific to different characters.

In some implementations, during transfer learning, the latent embeddings within the simulated character model are subject to modifications to cater to the requirements of different character morphologies or interaction types. This adjustment involves the system re-encoding the latent embeddings based on the new character specifications, such as, for example, the configuration of joints or proportions of body parts.

In some implementations, the system applies transfer learning to the control policy for the purpose of adapting to different morphologies and interactions without necessitating a complete retraining from scratch. The system retains the motion and interaction features encoded in the policy while making necessary adjustments to cater to new simulated characters.

In some implementations, the system synchronizes actions by simulated characters within a virtual environment. Characters perform cooperative tasks according to a control policy. This policy regulates actions based on timing and spatial data relevant to each character's role in the task. Actions may include coordinated speeds, matched movements, or sequential activities. For example, in the case of a complex coordinated motion, such as a complex dance, the motion may be broken down into smaller steps which are performed in a particular sequence between the interacting characters.

In some implementations, reward functions in a reinforcement learning framework are constructed to address synchronization. These functions measure the accuracy of timing and motion across characters. The policy refines its outputs by optimizing against these reward functions, which are designed to evaluate the alignment of character actions with predefined motion sequences. In some implementations, predictive mechanisms within the control policy align character interactions with imminent task states. The policy adjusts to temporal shifts in the task environment, allowing characters to retain coordination over varying scenarios without reference to underlying intentions or benefits.

In some implementations, the FNN outputs are utilized to generate a database of motion patterns for one or both of: a set of different character morphologies, and a set of different interaction scenarios. In some implementations, utilizing the FNN outputs for database creation involves capturing and storing motion patterns associated with different character morphologies. This database represents a repository of predefined motion sequences tailored to specific character types, e.g., character morphologies such as specific skeleton types. In some implementations, the database includes a number of interaction scenarios. The FNN outputs contribute to the compilation of motion patterns corresponding to various different virtual interactions.

Figure 3:
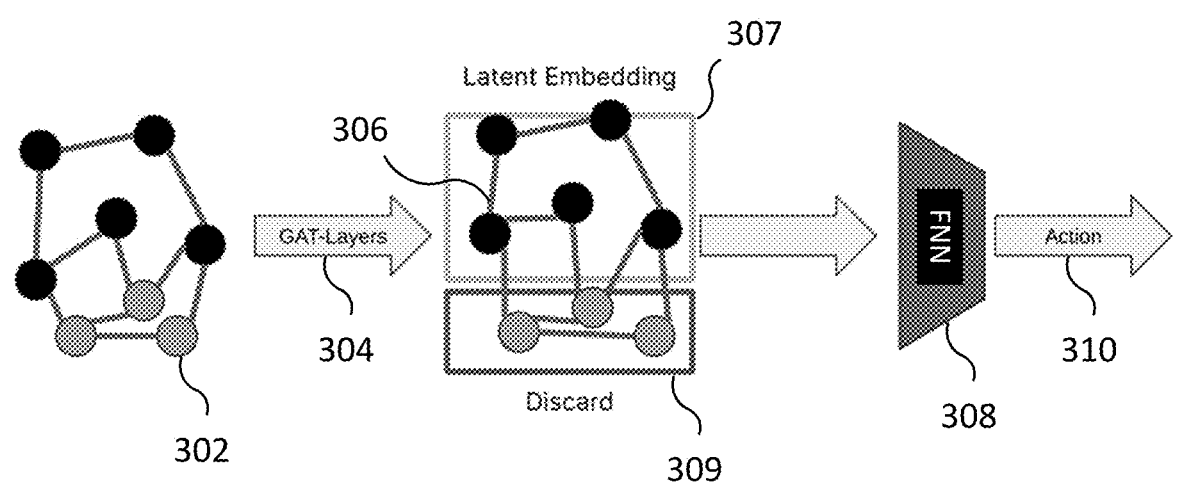
FIG. 3 is a diagram illustrating a method of generating and applying control signals for a simulated character's movements from a control policy, in accordance with some implementations.

FIG. 3 is a diagram illustrating a method of generating and applying control signals for a simulated character's movements from a control policy, in accordance with some implementations.

Interaction graph 302, depicted on the left side of FIG. 3, is a visual representation of a control policy for movement of a simulated character. This graph has been trained for a particular motion of the simulated character. Graph 302 encapsulates the dynamics of the simulated character's motion within a virtual environment. The graph is made up of a set of nodes and edges. The graph models features of the simulated character's body and the elements present in the virtual environment. The nodes correspond to descriptive points, including internal aspects of the character and external entities within the environment, forming a comprehensive network that encapsulates the character's interactions. The edges denote connections between these nodes, representing the relationships and dependencies needed for defining the simulated character's behavior.

GAT Layers 304 (represented as an arrow labeled "GAT-Layers") represent the system utilizing Graph Attention Network layers (and/or other GNN) to process the interaction graph 302. GAT layers 304 receive interaction graph 302 and provide a latent embedding that has fewer dimensions than the graph 302. GAT layers 304 play a role in processing the information encoded within the interaction graph. These layers implement a specialized neural network architecture designed for graph-based data, allowing the system to discern and prioritize the significance of different nodes within the graph. The GAT layers contribute to the generation of latent embeddings by weighting the contributions of neighboring nodes.

The graph structure 306 represents the latent embeddings generated through the application of the GAT Layers 304. A top portion 307 of the graph is delineated as "Latent Embedding," signifying the encoded information that encapsulates essential characteristics of the simulated character's body and the virtual environment. A lower portion 309 is labeled "Discard," marking the removal of a subset of information from graph nodes through a discarding process. This selective retaining and discarding of information is performed in order for the system to generate a fixed-length latent vector.

Following the generation of the fixed-length latent vector through the latent embedding and discarding stages, the information is subsequently fed into the FNN 308 for further processing. The FNN, representing a sequence of fully connected layers, plays a role in transforming the encoded latent information into actionable control signals for the simulated character. This transformation is a result of the FNN's capacity to learn complex patterns and relationships within the encoded data. The action stage 310 (an arrow labeled "Action") signifies the output of the FNN in the form of control signals that direct the movements and interactions of the simulated character within the virtual environment. The action stage 310 includes the system applying these control signals to the body of the simulated character within the virtual environment.

Figure 4A:
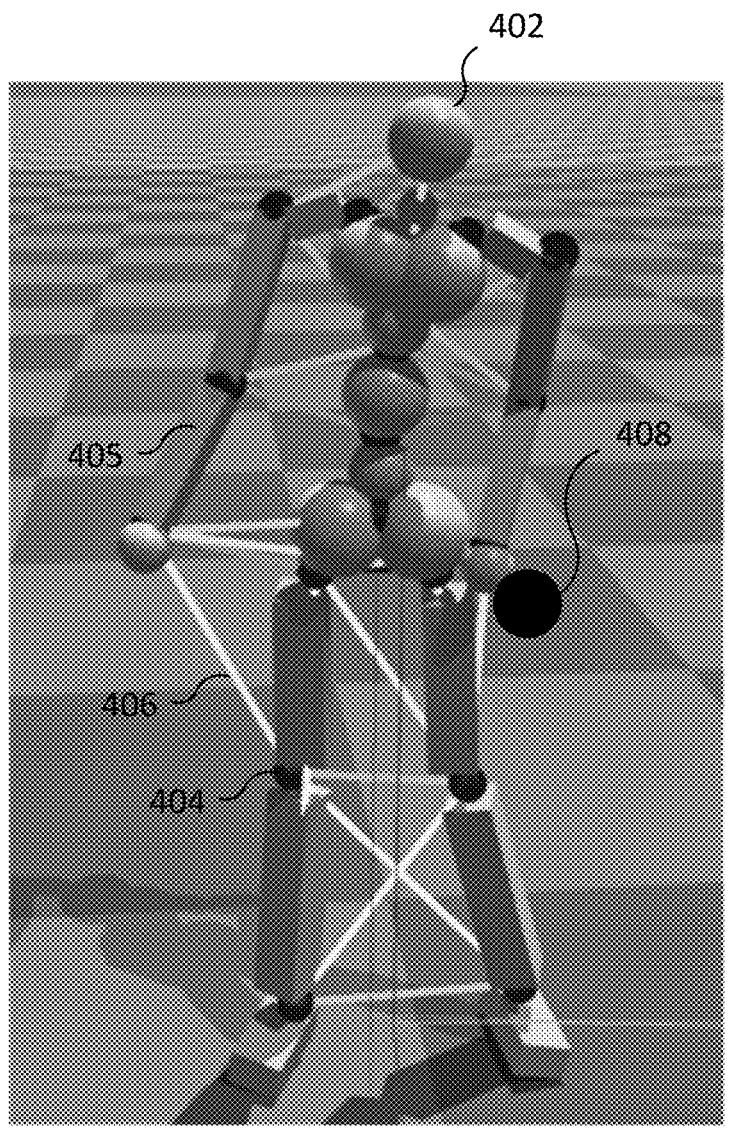
FIG. 4A is a diagram illustrating an example of a simulated character within a virtual environment, in accordance with some implementations.

FIG. 4A is a diagram illustrating an example of a simulated character within a virtual environment, in accordance with some implementations. The simulated character is depicted as a polygonal model portraying a humanoid avatar 402 with a fundamental morphology encompassing distinguishable features such as a head, arms, legs, and feet and joints between these features. Internal nodes 404 within the character's body are visually denoted, corresponding to particular points on the avatar that describe motion and interactions of the avatar, and may represent features (such as head or hands) and/or joints between features (e.g., elbows, shoulders, knees, ankles, etc.). Internal links 405 within the character's body are also visually denoted, may connect two nodes 404, and can correspond to features of the avatar such as limbs (e.g., upper arm, lower arm, upper leg, etc.).

Edges 406 in the diagram indicate relational connections between nodes 404, exemplifying the character's internal structure. These edges 406 can be determined by a K-nearest neighbor (KNN) algorithm, and highlight the immediate neighboring relationships between nodes within the character's body. The choice of KNN algorithm aids in capturing the spatial proximity of nodes, a factor in representing realistic and contextually relevant interactions within the character's body. Techniques described herein may use the connections between closest neighbor nodes, as indicated by edges 406 in this example, to preserve spatial relationships for generating coherent and plausible motion interactions by the character.

External node 408 in the diagram is an example of one or more nodes external to the character's body which can be added to the graph to support external interactions with elements in the surrounding environment as described herein. External node 408 in this example may be a ball or other object within the environment, external to the character's body, or may be a particular spatial area that has been determined to potentially provide interaction for the character, e.g., a space in which another object may move to. Additional external nodes may be positioned at different areas around the character.

Figure 4B:
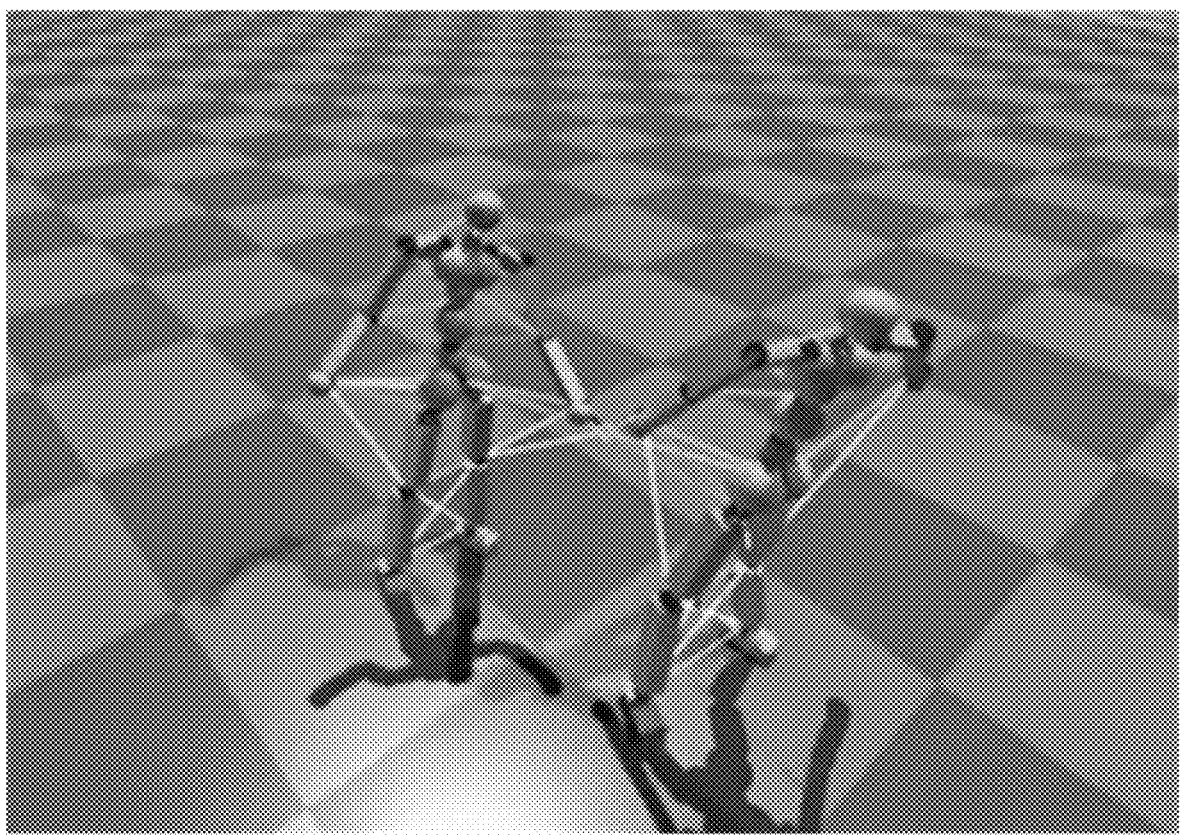
FIG. 4B is a diagram illustrating an example of reinforcement learning for a multi-character interaction, in accordance with some implementations.

FIG. 4B is a diagram illustrating an example of reinforcement learning for a multi-character interaction, in accordance with some implementations. Specifically, the illustration depicts the outcome of reinforcement learning for a multi-character interaction within a virtual environment. The visual representation displays two humanoid avatars, each designed with a polygonal model. Both are facing forward in the simulated environment. Notably, a first one of the avatars (the avatar closer to the right edge of the figure) extends or reaches its hand backward to touch the hand of the second avatar (the avatar closer to the left edge of the figure), while the second avatar slightly extends its hand forward to touch the first avatar's hand. This represents a specific interaction scenario achieved through the adaptation of the avatars' respective control policies. In some examples, an external node is placed between the hands of the avatars as a potential interaction node.

The control policies for both avatars have been iteratively optimized based on received reward signals as described above. Through this process, the avatars have learned to coordinate their actions in a synchronized manner, resulting in the desired interaction of holding hands. The adaptability of the control policies is underscored, indicating their capability to generalize to different character morphologies and different interaction scenarios within the virtual environment.

Various example implementations of one or more features described herein can also or alternatively include one or more of the following.

A control policy, implemented by a machine learning model (e.g., a machine learning controller) via a neural network, manages interaction between a character and one or more other characters or other objects. In some implementations, the character can be represented by a graph, such as a graph data structure.

A control policy, implemented by a machine learning model (e.g., a machine learning controller) via a neural network, is adaptable to manage interaction between a character and one or more other characters or other objects.

In some implementations, a graph of greater number of dimensions representing the character is compressed to a simpler representation with a smaller number of dimensions in the embedding space, which is specific to the behavior being created for the control policy. Multiple different character morphologies can be controlled by the control policy to perform the behavior because the morphologies can all use the same (lower-dimensional) latent space.

In some implementations, a method can include obtaining a controller that controls movements of a reference graph representation of a character, the controller being trained based on a base control policy to cause the character to follow a reference motion trajectory (e.g., a predetermined reference motion trajectory). The reference graph representation of the character is processed by a neural network to a latent space that has different dimensions than the reference graph representation, to recast the reference graph representation to a modified graph representation having one or more different structures than the reference graph representation to adapt the base policy to a modified policy. In some implementations, this allows a network that was learned on a first graph having N nodes to be able to support runtime inference for a second graph having any number of nodes, e.g., the second graph can represent a character having a different morphology with a different skeletal structure and/or fewer or greater number of nodes than the original graph/character. In some implementations, the one or more different structures of the modified graph representation can include discarding and/or addition of nodes.

In some implementations, a method to provide a generalized control policy for interaction of a character with other objects can include obtaining data indicating a reference motion of the reference avatar, and/or obtaining (or building) and storing a reference graph for the reference motion, the graph capturing the spatial relationship of the character and an external object, where the reference graph is a set of spatial descriptors that encode relative information among the vertices in the reference graph; initializing a simulation graph for a simulated motion; assigning weights to each edge of the reference graph and the simulated graph; measuring distances between positions and velocities of the reference graph and the simulated graph using the weighted edges; determining an interaction reward function based on the measured distances, e.g., to reward minimization of distance between internal nodes and external nodes, or reward movement of the internal nodes toward the external nodes; and optimizing a combination of the interaction reward function and a motion reward function that rewards the simulated graph for imitating motion of the reference graph.

Figure 5:
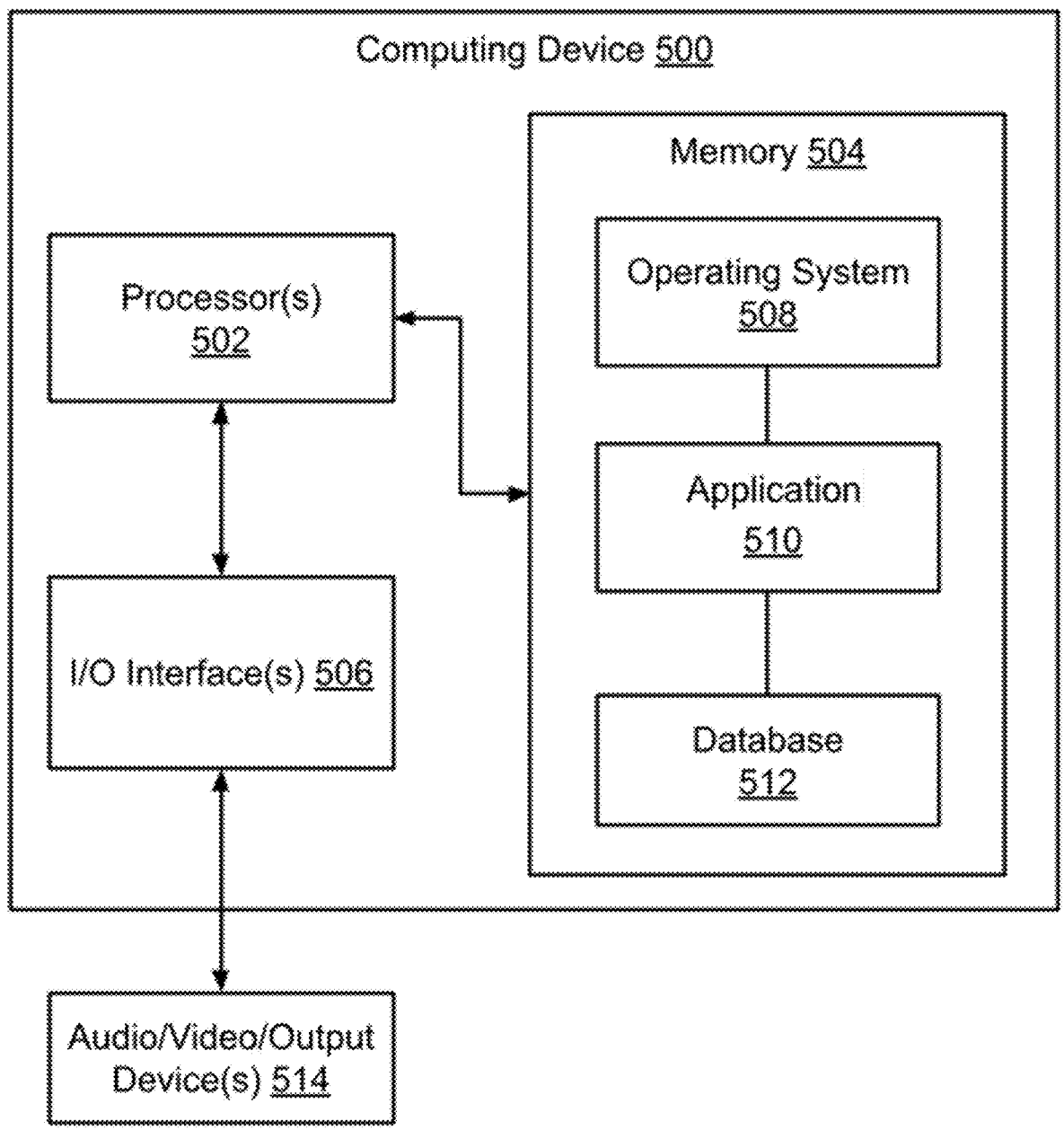
FIG. 5 is a block diagram that illustrates an example computing device, in accordance with some implementations.

FIG. 5 is a block diagram of an example computing device 500 which may be used to implement one or more features described herein. In one example, device 500 may be used to implement a computer device (e.g., 102 and/or 110 of FIG. 1), and perform appropriate method implementations described herein. Computing device 500 can be any suitable computer system, server, or other electronic or hardware device. For example, the computing device 500 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 500 includes a processor 502, a memory 504, input/output (I/O) interface 506, and audio/video input/output devices 514.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Various engines, modules, instructions, machine learning models, software code, and other blocks used in described features can be stored in memory 504 and/or other connected storage devices (e.g., database 512). Memory 504 can store software operating on the server device 500 by the processor 502, including an operating system 508, one or more applications 510, and a database 512 that may store data used by the components of device 500. In some implementations, applications 510 can include software applications, engines, machine learning models, etc., that include instructions that enable processor 502 to perform the functions (or control the functions of) described herein, e.g., some or all of the methods described with respect to FIG. 2. For example, applications 510 can include a control policy module that implements one or more machine learning models used in techniques described herein. Applications 510 can include GNNs such as GAT layers 304 and FNN 308 (e.g., an MLP) of FIG. 3. Database 512 (and/or other connected storage) can store various data used in described techniques, including graph representations, latent embeddings, latent vectors, training data, etc.

Elements of software in memory 504 can alternatively be stored on any other suitable storage location or computer-readable medium. In addition, memory 504 (and/or other connected storage device(s)) can store instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. For example, network communication devices, storage devices (e.g., memory and/or data store 120), and input/output devices can communicate via interface 506. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 514 can a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 5 shows one block for each of processor 502, memory 504, I/O interface 506, and software blocks of operating system 508 and virtual experience application 510. These blocks may represent one or more processors or processing circuitries, operating systems, memories, I/O interfaces, applications, and/or software engines. In other implementations, device 500 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 500 can be a server device or client device. Example client devices or user devices can be computer devices including some similar components as the device 500, e.g., processor(s) 502, memory 504, and I/O interface 506. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 514, for example, can be connected to (or included in) the device 500 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

What is claimed is:

1. A computer-implemented method comprising:
   accessing a graph representing a motion control policy for a simulated character in a virtual environment, the graph comprising a plurality of nodes, the nodes comprising features of a body of the simulated character and the virtual environment;
   encoding information for the graph comprising one or more of: position, velocity, or orientation of each node, the information including relational information of node pairs connected by edges;
   processing the encoded information through a graph neural network to generate one or more latent embeddings for the nodes of the graph;
   determining a fixed-length latent vector from the one or more latent embeddings;
   sending the fixed-length latent vector as input into a feedforward neural network to output control signals for the simulated character;
   applying the control signals to the body of the simulated character within the virtual environment to provide actions of the simulated character;
   evaluating the actions of the simulated character via a reward function to assess motion quality of the actions and interaction quality of the actions; and
   adapting the control policy through reinforcement learning by iteratively adjusting the graph based on the evaluating via the reward function, wherein the adaptation generalizes to one or both of: different character morphologies and different interactions within the virtual environment.

2. The method of claim 1, wherein determining the fixed-length latent vector includes discarding a portion of the one or more latent embeddings to remove information pertaining to a subset of the nodes.

3. The method of claim 1, wherein the graph neural network includes one or more graph attention network (GAT) layers.

4. The method of claim 1, wherein the feedforward neural network comprises a multi-layer perceptron (MLP) that includes a sequence of fully connected layers.

5. The method of claim 1, wherein the virtual environment comprises at least one additional character that the simulated character interacts with as part of the motion control policy.

6. The method of claim 1, wherein the nodes of the graph represent a plurality of internal points on the simulated character and a plurality of external points that are external to the simulated character.

7. The method of claim 1, wherein the edges of the graph represent the nearest neighbors of each node determined by a K-nearest neighbor (KNN) algorithm.

8. The method of claim 1, wherein the encoding further comprises computation of angular velocity for each node.

9. The method of claim 1, wherein the graph is updated dynamically based on interactions of the character within the simulated environment.

10. The method of claim 9, where the graph is updated dynamically based on a changing location of a target character or object within the simulated environment.

11. The method of claim 1, wherein discarding the portion of the latent embeddings includes selectively compressing information specific to one or more of the nodes in the graph.

12. A system comprising:
    one or more processors; and
    memory storing instructions that, when executed by the one or more processors, cause the system to perform operations comprising:
    accessing a graph representing a motion control policy for a simulated character in a virtual environment, the graph comprising a plurality of nodes, the nodes comprising features of a body of the simulated character and the virtual environment;
    encoding information for the graph comprising one or more of: position, velocity, or orientation of each node, the information including relational information of node pairs connected by edges;
    processing the encoded information through a graph neural network to generate one or more latent embeddings for the nodes of the graph;
    discarding a portion of the one or more latent embeddings to remove information pertaining to a subset of the nodes to obtain a fixed-length latent vector;
    sending the fixed-length latent vector as input into a feedforward neural network to output control signals for the simulated character;
    applying the control signals to the body of the simulated character within the virtual environment to provide actions of the simulated character;
    evaluating the actions of the simulated character via a reward function to assess motion quality of the actions and interaction quality of the actions; and
    adapting the control policy through reinforcement learning by iteratively adjusting the graph based on the evaluating via the reward function, wherein the adaptation generalizes to one or both of: different character morphologies and different interactions within the virtual environment.

13. The system of claim 12, wherein the reward function comprises one or more of: joint angle matching, joint velocity matching, end-effector position matching, or root state matching.

14. The system of claim 12, wherein the reward function comprises a product of a joint-matching term and an interaction-matching term.

15. The system of claim 12, wherein the control signals determine one or both of: angles or torques for joints in the simulated character.

16. The system of claim 12, wherein the instructions further cause the system to perform an operation comprising:

random sampling to introduce additional nodes during the training phase.

17. The method of claim 12, wherein:

the graph neural network includes one or more graph attention network (GAT) layers; and the feedforward neural network comprises a multi-layer perceptron (MLP) that includes a sequence of fully connected layers.

18. The system of claim 12, wherein the operation of adapting the control policy comprises transfer learning for additional simulated characters, wherein the simulated characters perform tasks involving synchronized actions.

19. The system of claim 12, wherein the outputs of the feedforward neural network are utilized to generate a database of motion patterns for one or both of: a plurality of different character morphologies, and a plurality of different interaction scenarios.

20. A non-transitory computer-readable medium containing instructions comprising:

accessing a graph representing a motion control policy for a simulated character in a virtual environment, the graph comprising a plurality of nodes, the nodes comprising features of a body of the simulated character and the virtual environment;

encoding information for the graph comprising one or more of: position, velocity, or orientation of each node, the information including relational information of node pairs connected by edges;

processing the encoded information through a graph neural network to generate one or more latent embeddings for the nodes of the graph;

modifying a portion of the latent embeddings to obtain a fixed-length latent vector;

sending the fixed-length latent vector as input into a feedforward neural network to output control signals for the simulated character;

applying the control signals to the body of the simulated character within the virtual environment to provide actions of the simulated character;

evaluating the actions of the simulated character via a reward function to assess motion quality of the actions and interaction quality of the actions; and adapting the control policy through reinforcement learning by iteratively adjusting the graph based on the evaluating via the reward function, wherein the adaptation generalizes to one or both of: different character morphologies and different interactions within the virtual environment.

* * * * *